March 3, 1964  E. PAGE  3,123,183
LEVER ACTUATED DISC BRAKES HAVING PIVOTALLY
AND AXIALLY MOVABLE FRICTION PAD SUPPORTS
Filed May 26, 1961  2 Sheets-Sheet 1

ERNEST PAGE
INVENTOR.

BY John R. Faulkner
Clifford L. Sadler

ATTORNEYS

March 3, 1964  E. PAGE  3,123,183
LEVER ACTUATED DISC BRAKES HAVING PIVOTALLY
AND AXIALLY MOVABLE FRICTION PAD SUPPORTS
Filed May 26, 1961  2 Sheets-Sheet 2

ERNEST PAGE
INVENTOR.

BY John R. Faulkner
Clifford L. Sadler

ATTORNEYS

0
United States Patent Office 3,123,183
Patented Mar. 3, 1964

3,123,183
LEVER ACTUATED DISC BRAKES HAVING PIVOTALLY AND AXIALLY MOVABLE FRICTION PAD SUPPORTS
Ernest Page, Upminster, England, assignor to Ford Motor Company, Dearborn, Mich., a corporation of Delaware
Filed May 26, 1961, Ser. No. 112,850
Claims priority, application Great Britain Sept. 6, 1960
9 Claims. (Cl. 188—73)

This invention relates to disc brakes for motor vehicles and more particularly to a vehicular disc type parking brake assembly.

In a common form of disc brake, the primary brake caliper assembly surrounds the brake disc and is supported by radially extending support arms. The support arms are secured to a nonrotating portion of the vehicle. The disposition of the parking brake assembly in a construction of the type described presents several problems. It is difficult to obtain maximum parking brake friction pad area with the parking brake actuating lever and intermediate pad supporting levers in the desirable tangential location with respect to the effective disc radius.

The disc type parking brake assemblies, now in common use, present another problem. The friction pads are conventionally supported directly by pivoted intermediate levers. Pivotal movement of the intermediate levers during actuation does not bring the pad surfaces into direct axial contact with the brake disc and uneven pad wear results.

It is an object of the present invention to provide a disc type parking brake assembly having tangentially disposed levers without requiring a sacrifice of friction pad area.

It is a further object of the present invention to provide a friction pad support for lever actuated brakes that promotes uniform pad wear.

With the disc brake embodying the present invention, the parking brake friction pads are asymmetrically mounted with respect to the intermediate levers. The pads may thereby conform closely with the inner and outer effective brake disc circumferences. The support for the pads allows the pads to move into direct axial contact with the brake disc. The connections between the intermediate levers and the friction pad supports allows the pads to pivot relative to the levers during actuation. The pads may thereby move into direct axial contact with the disc to promote even pad wear.

Further objects and advantages of this invention will become more apparent as this description proceeds particularly when considered in connection with the accompanying drawings, wherein.

Figure 1:
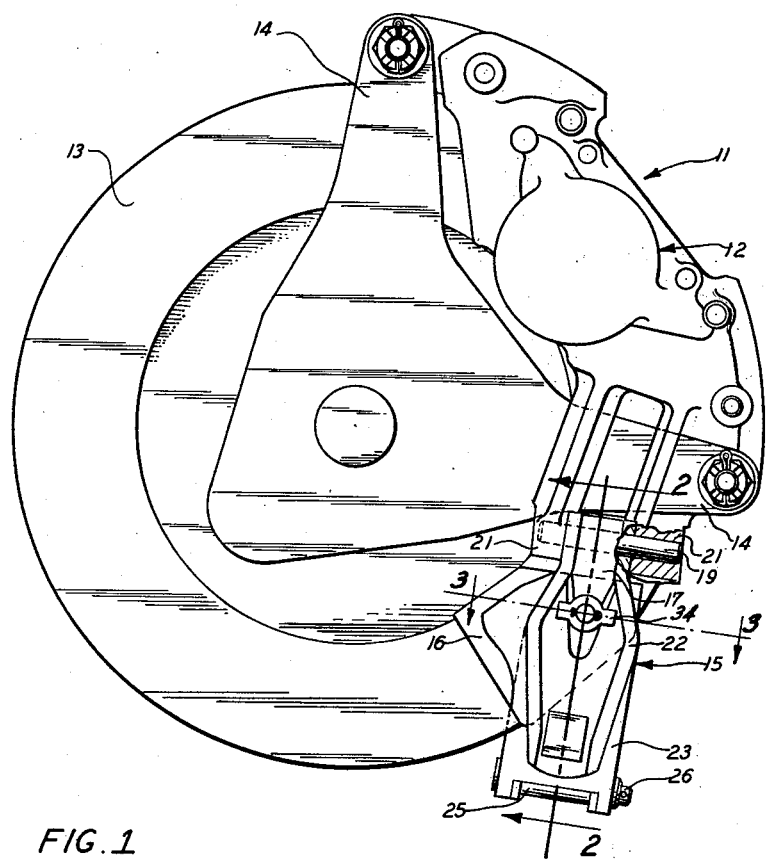
FIGURE 1 is a side elevational view of a disc brake embodying the present invention with a portion broken away to more clearly show the construction.
Figure 2:
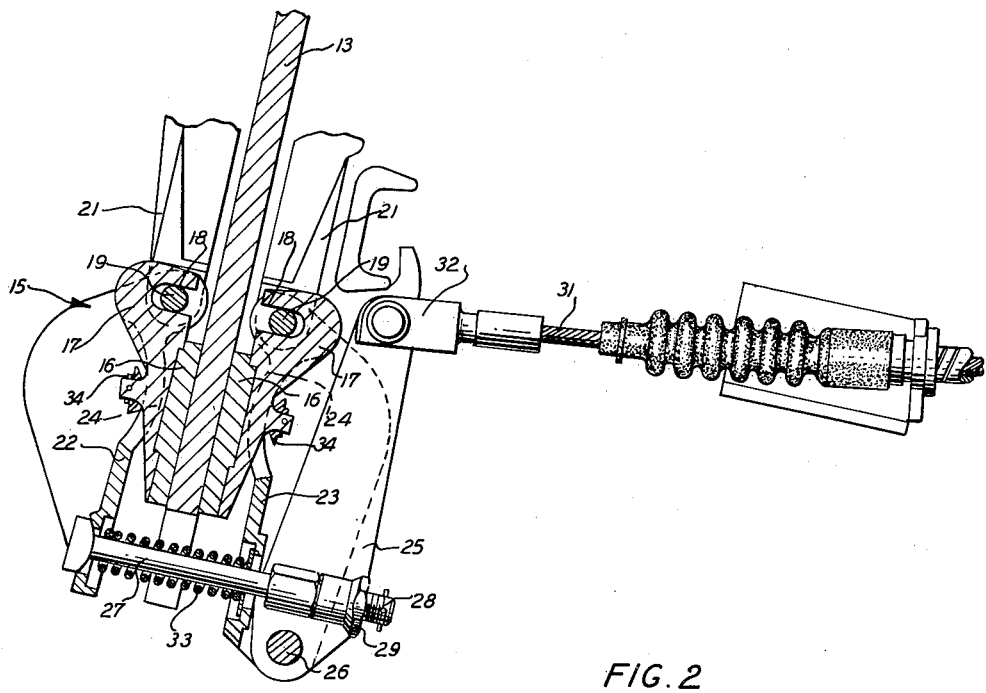
FIGURE 2 is a cross sectional view taken along line 2—2 of FIGURE 1.
Figure 3:
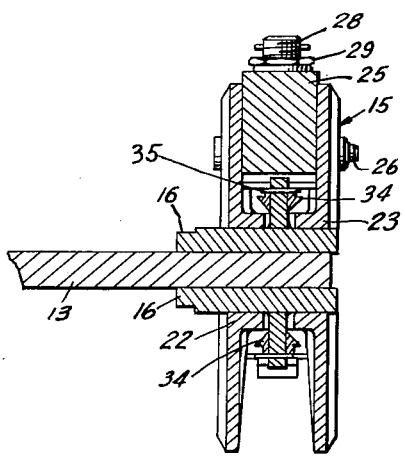
FIGURE 3 is a cross-sectional view taken along line 3—3 of FIGURE 1.

Referring now in detail to the drawings, there is shown generally at 11 a primary brake assembly. The primary assembly 11 includes the hydraulically actuated caliper assembly 12 that encircles the rotatable brake disc 13. Caliper assembly 12 is supported by the radially extending arms 14 that are suitably secured to any non-rotating portion of the vehicle by means not shown. The structure thus far described is conventional and forms no part of the present invention.

The parking brake asembly is indicated generally at 15. Parking brake assembly 15 comprises the friction pads 16 supported in recesses formed in the support levers 17. Support levers 17 are mounted by the lost motion slots 18 on the pivot pins 19. Pivot pins 19 are supported by the extensions 21 integrally formed on primary caliper assembly 12. The pin and slot connection allows axial movement of levers 17 and friction pads 16 relative to brake disc 13 and also pivotal movement with respect thereto.

The intermediate levers 22 and 23 are pivotally supported by pivot pins 19 and are formed with curved surfaces 24 intermediate their ends. Curved surfaces 24 cooperate with complementary curved surfaces formed on support levers 17 in the manner to be described.

An actuating lever 25 is pivotally supported on intermediate levers 23 as by the pin 26. A tie bolt 27 having a threaded end 28 serves to interconnect intermediate lever 22 and actuating lever 25. Adjustment of the parking brake assembly 15 for wear of pads 16 is accomplished by tightening of nut 29 threaded on end 28 of tie bolt 27. A flexible cable 31 is connected to actuating lever 25 as at 32.

A force exerted on cable 31 causes intermediate levers 22 and 23 to pivot about pin 19 toward the surface of brake disc 13. This motion is transmitted to support levers 17 and pads 16 through the curved surfaces 24. The connection between intermediate levers 22, 23 and support levers 17 as well as the pin and slot support for the latter allows pads 16 to float a limited amount while moving into direct axial contact with brake disc 13. The floating motion equalizes the pressure between the respective pad in addition to promoting uniform wear over the pad surfaces.

A coil spring 33 encircles the bolt 27 and urges the intermediate levers 22 and 23 away from the brake disc 13. Collars 34 are positioned upon the support levers 17 by cotter keys 35. The collars 34 coact with the intermediate levers 22 and 23 to locate the support levers 17 in a fixed axial position relative thereto. When actuating lever 25 is released, the spring 33 causes the intermediate levers 22 and 23 to spread and, because of their contact with the collars 34, retract the brake pads 16.

It should be noted that the approximate radial disposition of pivot pins 19 results in substantially tangential disposition of all of the parking brake levers with respect to the effective disc circumference. It should be further noted that, although pads 16 are asymmetrically disposed with respect to intermediate levers 22 and 23, the curved surfaces 24 apply the braking pressure at the geometric center of the pads.

It will be understood that the invention is not to be limited to the exact construction shown and described, but that various changes and modifications may be made without departing from the spirit and scope of the invention, as defined by the appended claims.

I claim:

1. In a brake assembly having a rotatable brake disc and a nonrotating primary brake unit, a parking brake assembly comprising friction pads disposed on opposite sides of said brake disc, lever means supported on said primary brake unit and tangentially disposed relative to the effective circumference of said brake disc supporting said pads for pivotal movement with respect to said primary brake unit and axial movement with respect to said brake disc, and means operable to urge said friction pads into direct axial contact with said brake disc, said friction pads being asymmetrically disposed with respect to said last named means.

2. In a brake assembly having a rotatable brake disc and a nonrotating primary brake unit, a parking brake assembly comprising friction pads disposed on opposite sides of said brake disc, support means connected to said primary brake unit supporting said friction pads for pivotal movement with respect to said primary brake unit and axial movement with respect to said brake disc, and lever means tangentially disposed with respect to the effective circumference of said brake disc pivotally supported on said primary brake unit, said lever means having curved bearing surfaces cooperating with complementary curved bearing surfaces formed on said support means for causing axial movement of said friction pads into contact with said brake disc upon pivotal movement of said lever means and allowing pivotal movement of said friction pads relative to said lever means for promoting uniform friction pad wear.

3. A brake assembly comprising a rotatable brake disc, stationary pivot pins, first lever means, support means for said first lever means to allow for the latter's pivotal movement about said pivot pins and for axial movement with respect to said brake disc, friction pads supported by said first lever means on opposite sides of said brake disc, second lever means pivotally supported by said pivot pins, means operably connected to said second lever means to cause pivotal movement thereof in a direction toward said brake disc, and curved bearing surfaces on said second lever means cooperating with complementary surfaces formed on said first lever means for causing said first lever means and said friction pads to move into direct axial contact with said brake disc upon pivotal movement of said second lever means.

4. A brake assembly having a rotatable brake disc and a nonrotating primary brake unit, pivot pins supported by said primary brake unit, first lever means, support means for said first lever means to allow for the latter's pivotal movement about said pivot pins and for axial movement with respect to said brake disc, friction pads supported by said first lever means on opposite sides of said brake disc, second lever means pivotally supported by said pivot pins, means operable to cause pivotal movement of said second lever means in a direction toward said brake disc, and curved bearing surfaces on said second lever means cooperating with complementary surfaces formed on said first lever means for causing axial movement of said first lever means and said friction pads into direct axial contact with said brake disc upon pivotal movement of said second lever means, all of said lever means being tangentially disposed with respect to the effective circumference of said brake disc, said friction pads being asymmetrically disposed with respect to said lever means.

5. A brake assembly having a rotatable brake disc, a fixed reaction member, actuating levers pivotally supported upon said fixed reaction member on each side of said disc tangential to its effective circumference, friction pads disposed on each side of said disc between said actuating levers and the adjacent surface of said disc, a supporting lever affixed to each of said friction pads, support means for said supporting levers to pivotally support the supporting levers from said fixed reaction member and to allow for their axial movement with respect to said disc, and an operative connection between said actuating levers and said supporting levers for transmitting pivotal movement of said actuating levers into axial movement of said supporting levers to bring said friction pads into direct axial contact with said brake disc.

6. A brake assembly having a rotatable brake disc, first and second pivot pins stationarily supported on opposite sides of said disc, an actuating lever pivotally supported upon each of said pivot pins and extending tangentially to the effective circumference of said disc, a supporting lever, supporting means for said supporting lever to support the latter for pivotal movement about said pivot pins and for transverse movement with respect thereto, a portion of each of said supporting levers being interposed between a portion of its respective actuating lever and the adjacent surface of said disc, a friction pad secured to each of said supporting levers adjacent said brake disc, and a curved bearing surface upon each of said actuating levers cooperating with a complementary curved bearing surface formed in the respective supporting lever for transmitting pivotal movement of said actuating levers into transverse movement of said supporting levers to bring said friction pads into direct axial contact with said brake disc.

7. A brake assembly having a rotatable brake disc, a fixed reaction member, actuating levers pivotally supported upon said fixed reaction member on each side of said disc tangential to its effective circumference, friction pads interposed between each of said actuating levers in the adjacent surfaces of said disc asymmetrically to said actuating levers, a supporting lever affixed to each of said friction pads, support means for said supporting levers to pivotally support said supporting levers from said fixed reaction member and to allow for the axial movement of said supporting members with respect to said disc, and an operative connection between said actuating levers and said supporting levers for transmitting pivotal movement of said actuating levers into axial movement of said supporting levers to bring said friction pads into direct axial contact with said brake disc.

8. A brake assembly having a rotatable brake disc, first and second pivot pins stationarily supported on opposite sides of said disc, an actuating lever pivotally supported upon each of said pivot pins and extending tangentially to the effective circumference of said disc, a supporting lever, support means for said supporting lever to pivotally support the latter upon each of said pivot pins, said support means also permitting the transverse movement of said supporting lever with respect to each of said pivot pins, a portion of each of said supporting levers being interposed between a portion of its respective actuating lever and the adjacent surface of said disc, a friction pad secured to each of said supporting levers adjacent said brake disc and asymmetrically with respect to the respective actuating lever, and a curved bearing surface upon each of said actuating levers cooperating with a complementary curved bearing surface formed in the respective supporting lever for transmitting pivotal movement of said actuating levers into transverse movement of said supporting levers to bring said friction pads into direct axial contact with said brake disc.

9. A brake assembly having a rotatable brake disc, first and second pivot pins stationarily supported on opposite sides of said disc, an actuating lever pivotally supported upon each of said pivot pins and extending tangentially to the effective circumference of said disc, supporting levers having slotted ends receiving said pivot pins to allow for pivotal and transverse movement of said supporting levers with respect to said pins, said supporting levers being tangential to the effective circumference of said disc, a portion of each of said supporting levers being interposed between a portion of its respective actuating lever and the adjacent surface of said disc, a friction pad secured to each of said supporting levers adjacent said brake disc asymmetrically to its respective actuating lever, and a curved bearing surface upon each of said actuating levers cooperating with a complementary curved bearing surface formed on its respective support lever for transmitting pivotal movement of said actuating members into transverse movement of said supporting levers to bring said friction pads into direct axial contact with said brake disc.

References Cited in the file of this patent
UNITED STATES PATENTS

| | | |
|---|---|---|
| 1,779,776 | Masion | Oct. 28, 1930 |
| 2,862,580 | Burnett | Dec. 2, 1958 |
| 2,917,134 | Buvelot | Dec. 15, 1959 |
| 2,987,142 | Gracie | June 6, 1961 |
| 3,005,522 | Butler | Oct. 24, 1961 |
| 3,027,982 | Butler | Apr. 3, 1962 |

FOREIGN PATENTS

| | | |
|---|---|---|
| 838,505 | Great Britain | June 22, 1960 |